United States Patent [19]
Brown

[11] 3,770,002
[45] Nov. 6, 1973

[54] AUTOMATIC WATER SHUT-OFF SYSTEM

[76] Inventor: Lawrence C. Brown, 2302 Buenos Aires Dr., Covina, Calif. 91722

[22] Filed: Nov. 1, 1971

[21] Appl. No.: 194,219

[52] U.S. Cl.............. 137/312, 200/61.05, 307/118
[51] Int. Cl. ..................... H01h 35/00, B08b 13/00
[58] Field of Search..................... 137/78, 312, 314; 340/235; 165/70; 431/119; 200/61.05; 307/118

[56] References Cited
UNITED STATES PATENTS

| R26,828 | 3/1970 | Atkins et al. | 137/392 |
| 2,009,760 | 7/1935 | Brown et al. | 340/235 |
| 2,531,159 | 11/1950 | Rowell | 137/312 X |
| 2,798,503 | 7/1957 | Carver et al. | 137/67 |
| 3,473,553 | 10/1969 | Collins | 137/312 |

Primary Examiner—Martin P. Schwadron
Assistant Examiner—Richard Gerard
Attorney—Boniard I. Brown

[57] ABSTRACT

An automatic water shut-off system for an appliance such as an automatic washing machine, water heater or the like, for cutting off the water supply to the appliance in the event of a malfunction such as a leak or overflow which may cause flooding. A solenoid shut-off valve is connected in each appliance water inlet and controlled by a leak detection system including an electrical water sensor located adjacent the appliance so as to be wetted by water leaking or overflowing from the appliance. The valve is automatically closed in response to a change which occurs in an electrical characteristic of the sensor when wetted. In the disclosed embodiment, the sensor is a capacitor having porous wick material between the capacitor plates for inducing wetting of the plates by water contacting the capacitor. The detection system embodies an oscillator which controls a switch for closing the shut-off valve in response to the change in the sensor leakage resistance which occurs when the detector is wetted.

9 Claims, 5 Drawing Figures

PATENTED NOV 6 1973 3,770,002
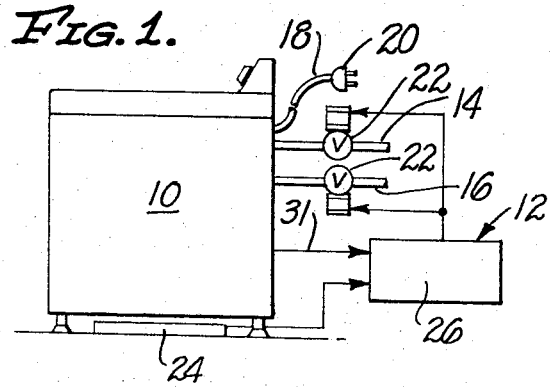
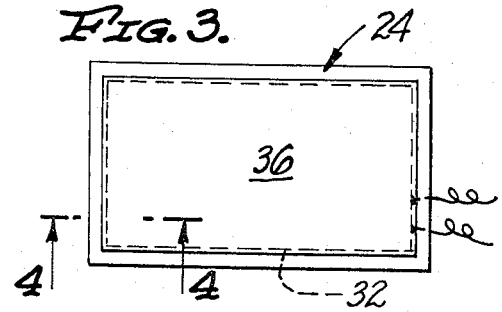
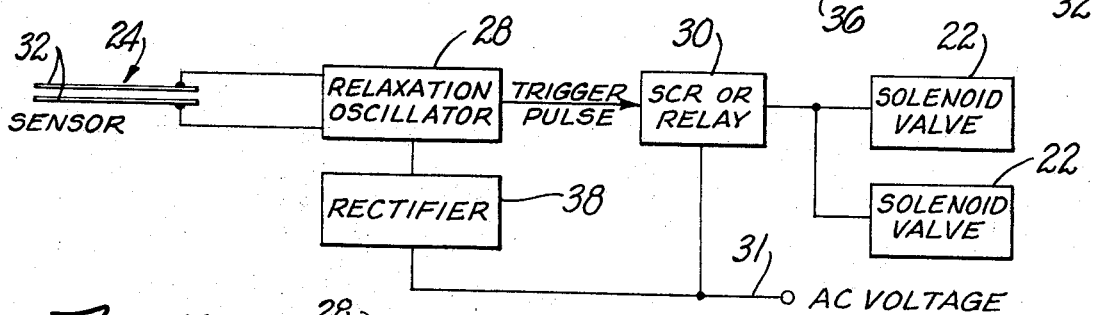
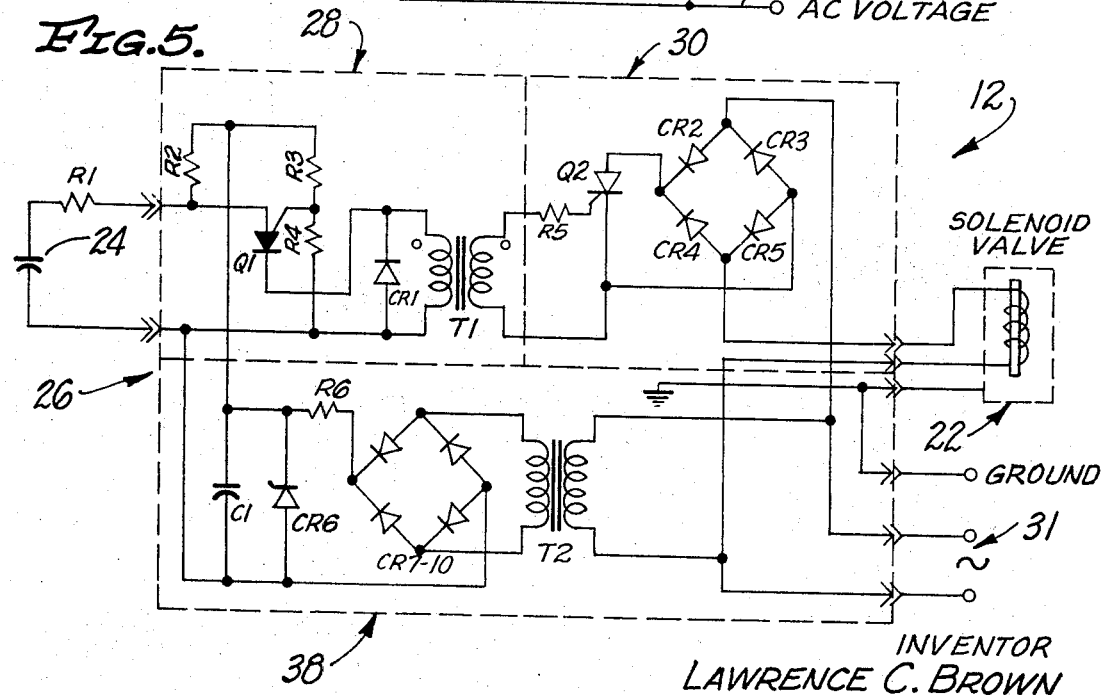
INVENTOR
LAWRENCE C. BROWN
BY
*Boniard I. Brown*
ATTORNEY

AUTOMATIC WATER SHUT-OFF SYSTEM

BACKGROUND OF THE INVENTION

1. Field of the Invention

This invention relates generally to automatic water shut-off systems and more particularly to such a system for cutting off the water supply to an appliance such as an automatic washing machine, water heater, or the like, in the event of a leak, overflow or other malfunction which may cause flooding.

2. Discussion of the Prior Art

An ever-present hazard of appliances such as automatic washing machines, water heaters, and the like, is the occurrence of a malfunction, such as a leak or overflow, which, if not stopped immediately, will cause flooding. This hazard is particularly serious when the appliance is located within a dwelling and left unattended for extended periods as are many household appliances of this kind.

The present invention provides an automatic water shut-off system for such appliances to eliminate the hazard of flooding. This shut-off system is actuated automatically in response to a change which occurs in an electrical characteristic of an electrical water sensitive leak detector when the detector is wetted. Automatic water shut-off systems and other detection systems embodying a water sensor are known in the art. Examples of such systems are found in U.S. Pat. Nos. Re. 26,828; 2,009,760 and 3,424,977.

SUMMARY OF THE INVENTION

The automatic water shut-off system of the present invention has a solenoid shut-off valve for connection in each water inlet to the appliance to be protected against flooding, and an electrical leak detection system for actuating the valve. This leak detection system includes and electrical water sensor having an electrical characteristic which varies when the sensor is wetted and means for actuating the shut-off valve to closed position in response to such change in the sensor characteristic. The sensor is placed below the appliance in a position such that the sensor is certain to be wetted in the event of a leak or overflow from the appliance.

In the disclosed embodiment of the invention, the water sensor is a capacitor, and the leak detection system includes a relaxation oscillator in circuit with the sensor capacitor and a switch for actuating the solenoid shut-off valve. When the sensor is dry, the oscillator oscillates at its normal frequency and delivers to the switch a signal for retaining the shut-off valve open. Wetting of the sensor changes the leakage resistance of the detector and thereby the operating state of the relaxation oscillator. This change in state interrupts the trigger pulses, thus deenergizing the switch to close the shut-off valve and cut off the water supply to the appliance. According to a feature of the invention, the water sensor is provided with capillary means in the form of porous wick-like dielectric material about and/or between the sensor capacitor plates for inducing wetting of the plates to alter the capacitor leakage resistance when the capacitor is contacted by water from the appliance.

BRIEF DESCRIPTION OF THE DRAWINGS

FIG. 1 illustrates the present water shut-off system connected to an automatic washing machine;

FIG. 2 is a block diagram of the system;

FIG. 3 is an enlargement of the water sensor;

FIG. 4 is an enlarged section taken on line 4—4 in FIG. 3; and

FIG. 5 is a circuit diagram of the system.

DESCRIPTION OF THE PREFERRED EMBODIMENT

The drawings illustrate an appliance 10, in this instance an automatic washing machine, equipped with an automatic water shut-off system 12 according to the invention. Washing machine 10 is conventional and includes hot and cold water inlet 14, 16 through which hot and cold water source is supplied to a water receptacle, i.e., the washer drum (not shown), of the machine. The electrical components of the machine are supplied with electrical power through a cord 18 having a plug 20 for insertion into an electrical receptacle.

Water shut-off system 12 includes solenoid shut-off valves 22 connected in the water inlets 14, 16, an electrical water sensor 24 possessing an electrical characteristic which has a normal value when the sensor is dry and another value when the sensor is wet, and a detection circuit 26 responsive to the sensor characteristic. The detection circuit is connected to the sensor and valves for retaining the valves open when the sensor characteristic value is normal and closing the valves in response to deviation of the characteristic value from normal. In the particular embodiment illustrated, the water sensor 24 is a capacitor whose electrical characteristic, which is varied by wetting, is the leakage resistance or simply the ability of the capacitor to be charged. The detection circuit 26 comprises an oscillator 28 whose oscillation is controlled by the sensor capacitance and which, in turn, controls a switch 30 for actuating the solenoid shut-off valves 22. The leak detection curcuit is electrically powered form the appliance 10 through an electrical connection 31 between the appliance and detection system and the appliance on-off switch, such that power to the circuit is cut off when the appliance is turned off.

Referring in more detail to the illustrated embodiment and particularly to FIGS. 2–5, the sensor capacitor 24 has a pair of spaced capacitor plates 32 separated by a layer 34 of porous wick-like dielectric material such as woven fiber glass. Additional layers 36 of such material are applied to the outer sides of the capacitor plates and joined about their edges in any convenient way to the edges of the central layer 34. The porous layers 34, 36 absorb any water which contacts the sensor. The water absorbed by the central dielectric layer 34 decreases the leakage resistance of the sensor and thereby effectively makes the sensor ineffective as a capacitor. Other wick arrangements may be employed, of course, to induce wetting of the sensor.

The illustrated detection oscillator 28 is a relaxation oscillator having an oscillator circuit connected across the capacitor plates 32 and to the switch 30. The switch may be a solid state switch or relay. Referring to the circuit of FIG. 5, R1 is a resistor which may be placed in series with the sensor 24 to render the system more nearly fail-safe. R2 is a resistor which charges the sensor capacitor. When the voltage across the sensor capacitor increases to the value established by R3 and R4, Q1 (a unijunction transistor) conducts and discharges the sensor capacitor. When Q1 conducts, a current pulse is applied to the primary of transformer T1. The charge and discharge cycle continues in a sustained oscillation. Each cycle produces a current pulse which is delivered to transformer T1. For safety, the low voltage oscillator is isolated from the higher voltage solenoid switch circuitry by the transformer. The primary current pulse develops a voltage pulse across the transformer secondary winding.

Each positive pulse developed across the transformer secondary is sufficient to turn on solid state device Q2 which may be a thyristor or SCR. The diode bridge, made up of solid state devices CR2 through CR5 in conjunction with Q2 forms an AC switch (switch 30). This AC switch will conduct current in either direction as long as the gate-to-cathode junction of Q2 is pulsed. The AC switch will stop conducting within one-half cycle of the applied AC voltage when the pulses are interrupted. Thus as long as the oscillator 28 continues to oscillate, Q2 will be triggered into conduction and the solenoid shut-off valves 22 will be energized (opened). If a high value resistor is placed across sensor 24 or if the porous dielectric layer 34 of the sensor capacitor becomes wet, the oscillator will not oscillate, and the solenoid valves 30 will be de-energized (closed).

Transformer T2 in conjunction with CR7 through CR10, R6, CR6 and the filter capacitor C1 provide a filtered and regulated low voltage DC source (rectifier) for the oscillator. The low supply voltage is required for safety.

In use, the water sensor 24 is placed below or adjacent the applicance 10 so as to be rapidly wetted in the event the aappliance developes a leak or overflows. When the sensor is dry, the leak detection circuit 26 retains the solenoid shut-off valves 22 open so long as the appliance is turned on. If the appliance is turned off or the water sensor becomes wet because of a leak or overflow, the valves are de-energized and closed to block water flow to the appliance.

What is claimed as new in support of Letters Patent is:

1. In combination:
   an appliance including a water receptacle and at least one inlet to said receptacle for connection to a source of water under pressure from which said receptacle is adapted to be filled with water in use, and
   an automatic electrical water shut-off system for said appliance including an electrical water sensor adapted to be placed adjacent said appliance externally of said receptacle so as to be wetted in the event of a water leak in said appliance and having an electrical characteristic which has a normal value when the sensor is dry and varies from said normal value when the sensor is wet, an electrical detection circuit responsive to said variation in said electrical characteristic, and a solenoid valve controlled by said detection circuit for blocking water flow to said receptacle through said inlet in response to departure of said characteristic value from said normal value.

2. The combination according to claim 1 wherein:
   said sensor is a capacitor and said electrical characteristic is the leakage resistance of said capacitor.

3. The combination according to claim 2 wherein:
   said capacitor comprises a pair of spaced capacitor elements, and capillary means for inducing wetting of said elements.

4. The combination according to claim 3 wherein:
   said capacitor elements comprise capacitor plates, and said capillary means comprise wick-like dielectric means between said plates.

5. The combination according to claim 4 including:
   additional wick-like means about the outside of said plates and joined to said dielectric means between the plates.

6. The combination according to claim 5 wherein:
   said detection circuit comprises a relaxation oscillator including said capacitor which oscillates at a given frequency when said capacitor is dry, and electrical switch means controlled by said oscillator and connected to said valve for energizing said valve to retain the valve open when said oscillator is oscillating at said given frequency.

7. The combination according to claim 6 wherein:
   said appliance is an electrical appliance such as an automatic washing machine having an electrical inlet for connection to an eletrical power source and a switch for turning said appliance on and off, and
   said water shut-off system includes an electrical connection to said appliance for powering said system from said appliance, whereby said valve closes when said appliance is shut off by said appliance switch.

8. The combination according to claim 1 wherein:
   said sensor is a capacitor and said electrical characteristic is the leakage resistance of said capacitor, and
   said detection circuit comprises a relaxation oscillator including said capacitor which oscillates at a given frequency when said capacitor is dry, and electrical switch means controlled by said oscillator and connected to said valve for energizing said valve to retain the valve open when said oscillator is oscillating at said given frequency.

9. The combination according to claim 8 wherein:
   said appliance is an electrical appliance such as an automatic washing machine having an electrical inlet for connection to an electrical power source and a switch for turning said appliance on and off, and
   said water shut-off system includes an electrical connection to said appliance for powering said system from said appliance, whereby said valve closes when said appliance is shut off by said appliance switch.

* * * * *